US010749971B2

(12) United States Patent
Gupta et al.

(10) Patent No.: US 10,749,971 B2
(45) Date of Patent: Aug. 18, 2020

(54) VIRTUAL PRIVATE NETWORK GATEWAY MANAGEMENT

(71) Applicant: Microsoft Technology Licensing, LLC, Redmond, WA (US)

(72) Inventors: Nalin Gupta, Bellevue, WA (US); Ashok Nandoori, Sammamish, WA (US); Mohit Garg, Redmond, WA (US); Ning Wei, Redmond, WA (US); Vikrant Arora, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 206 days.

(21) Appl. No.: 15/961,796

(22) Filed: Apr. 24, 2018

(65) Prior Publication Data

US 2019/0327312 A1    Oct. 24, 2019

(51) Int. Cl.
*H04L 29/06* (2006.01)
*H04L 12/46* (2006.01)
*H04L 12/26* (2006.01)
*H04L 29/08* (2006.01)

(52) U.S. Cl.
CPC ........ *H04L 67/148* (2013.01); *H04L 12/4633* (2013.01); *H04L 43/12* (2013.01); *H04L 29/06551* (2013.01)

(58) Field of Classification Search
CPC ....... H04L 67/148; H04L 47/16; H04L 43/12; H04L 63/0272; H04L 63/02
See application file for complete search history.

(56) References Cited

U.S. PATENT DOCUMENTS

| 7,246,373 | B1 * | 7/2007 | Leung | H04L 63/0272 |
| | | | | 709/227 |
| 9,813,379 | B1 * | 11/2017 | Shevade | H04L 63/0272 |
| 10,601,779 | B1 * | 3/2020 | Matthews | H04L 12/4633 |
| 2006/0047836 | A1 * | 3/2006 | Rao | H04L 67/14 |
| | | | | 709/229 |
| 2006/0104262 | A1 * | 5/2006 | Kant | H04W 76/10 |
| | | | | 370/352 |

(Continued)

FOREIGN PATENT DOCUMENTS

| CN | 104486191 A | 4/2015 | |
| WO | WO-2019209497 A1 * | 10/2019 | ......... H04L 63/0272 |

OTHER PUBLICATIONS

"International Search Report and Written Opinion Issued in PCT Application No. PCT/US2019/026210", dated Jul. 8, 2019, 10 Pages.

*Primary Examiner* — Shirley X Zhang
(74) *Attorney, Agent, or Firm* — Liang IP, PLLC

(57) ABSTRACT

Techniques for intelligently managing a virtual private network (VPN) gateway in a cloud computing system are disclosed herein. In one embodiment, an instance of a VPN gateway can query whether a logic lock on a network address is maintained by another instance via periodic renewal. In response to receiving a query result indicating that a logic lock on the network address is lost by the another instance, the instance can migrate a VPN connection originally handled by the another instance from the another instance to the instance such that a private network is connected to the instance via the migrated VPN connection to reduce downtime for accessing computing resources in the cloud computing system.

20 Claims, 12 Drawing Sheets

(56) References Cited

U.S. PATENT DOCUMENTS

| | | | |
|---|---|---|---|
| 2006/0176852 A1* | 8/2006 | Wu | H04L 63/0853 |
| | | | 370/331 |
| 2007/0113275 A1* | 5/2007 | Khanna | H04L 12/4641 |
| | | | 726/15 |
| 2009/0037763 A1* | 2/2009 | Adhya | H04L 12/4641 |
| | | | 714/4.12 |
| 2009/0144817 A1* | 6/2009 | Kumar | H04L 69/40 |
| | | | 726/12 |
| 2010/0071043 A1 | 3/2010 | Babula et al. | |
| 2012/0159235 A1* | 6/2012 | Suganthi | G06F 11/2028 |
| | | | 714/4.11 |
| 2014/0365549 A1* | 12/2014 | Jenkins | G06F 9/526 |
| | | | 709/201 |

* cited by examiner

VIRTUAL PRIVATE NETWORK GATEWAY MANAGEMENT

BACKGROUND

A virtual private network (VPN) extends a private network across a public network such as the Internet. A VPN enables users of the private network to send and receive data across a shared or public network as if being directly connected to the private network. Applications running across the VPN can therefore benefit from functionality, security, and management of the private network. For example, a VPN can allow employees of a corporation to securely access an intranet of the corporation remotely. In another example, a VPN can also be used to securely interconnect geographically separated offices of the cooperation into a global computer network.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A VPN can be accessed via secure virtual connections between pairs of VPN gateways (sometimes also referred to as "VPN servers" or "VPN routers") and/or VPN clients (e.g., a computer). The VPN gateways can be configured to implement suitable authentication, tunneling, and encryption protocols and facilitate corresponding operations. For example, a VPN gateway can be configured to authenticate VPN connection requests from, for instance, a VPN client or other VPN gateways. Upon authentication, the VPN gateway can establish a VPN connection by assigning a private network address, configuring a VPN tunnel via encapsulation and decapsulation of packets, performing encryption/decryption of content of the packets, and/or other suitable functions.

In one implementation, a company, cooperation, or other suitable types of organization can have an on-premise private network, for example, a local area network (LAN) deployed in an office to interconnect on-premise servers and computers. The organization can also subscribe and have access to a virtual network (VNET) hosted on a cloud computing system via a public network such as the Internet. To secure communications between the LAN and the VNET, the virtual network of the organization can deploy a VPN gateway to interface with, for example, a network router in the private network configured to implement Internet Protocol Security (IPsec) or other suitable secure communications protocols. In operation, the network router and the VPN gateway can send and receive encrypted network traffic across the public network as if the virtual network is directly connected to the on-premise private network via a dedicated communications link.

To ensure high availability, the virtual network typically can deploy multiple instances of the same VPN gateway each with a corresponding public IP address. Each instance can be provided by a virtual machine (VM), a container, or other suitable software components hosted on a single or multiple servers in the cloud computing system. All instances can have similar VPN configurations such as specified or selected values for authentication, tunneling, and encryption. As such, the network device at the on-premise private network can create multiple VPN connections or VPN tunnels individually corresponding to each of the instances of the VPN gateway. As such, the network device can send/receive network traffic to/from the virtual network via multiple VPN connections simultaneously in an active-active manner. In the following description, two instances of a VPN gateway are used as an example implementation though embodiments of the disclosed technology can be implemented with three, four, five, or any suitable numbers of instances of a VPN gateway.

The foregoing active-active implementation of instances of a VPN gateway may cause unacceptable VPN down time when one of the two VPN connections is not properly configured. Configuring a VPN connection can be technically involved. For example, to configure an instance of a VPN gateway, an administrator has to properly specify various parameters such as a VPN gateway type (e.g., VPN or Express Route), a connection type (e.g., IPsec, Vnet2Vnet, Express Route, or VPN client), VPN gateway subnet, and other types of parameters. The administrator also needs to properly configure domain name resolution at the on-premise private network by, for example, specifying suitable public IP addresses of the instances of the VPN gateway.

Often, one of the two VPN connections can be configured properly while the other is not. For example, an administrator can properly configure domain name resolution of a first public IP address of a first instance of the VPN gateway while improperly configure a second public IP address of a second instance in a domain name server of the on-premise private network. During operation, network traffic can flow between the on-premise private network and the virtual network via the first VPN connection directed to the first public IP address until the first VPN connection fails due to, for example, maintenance or hardware/software failure of a server hosting the first instance. Upon such a failure, the network device at the on-premise private network may not send any network traffic to the virtual network through the improperly second VPN connection, and thus causing a down time of up to thirty minutes for accessing the virtual network. Such long down times can negatively affect user experience of various resources or computing services provided via the virtual network.

Several embodiments of the disclosed technology can address certain aspects of the foregoing difficulties by implementing a gateway coordinator at each instance of a VPN gateway to provide mutual backup between the instances of the VPN gateway. In one aspect, the gateway coordinator can be configured to manage ownership of one or more public IP addresses associated with each instance of the VPN gateway. By managing the public IP addresses, one or more VPN connections to the network device at the on-premise private network can be maintained under several example scenarios described below. Additional scenarios are described in more detail with reference to the Detailed Description section of the present application.

In a first example scenario, a first instance of a VPN gateway can receive a notification from, for example, a platform controller of the cloud computing system. The notification indicates to the first instance that a server hosting the first instance is about to go down or otherwise become unavailable. In response to receiving the notification, the gateway coordinator of the first instance can contact a counterpart at a second instance of the VPN gateway regarding the upcoming down time of the first instance and determine whether the second instance is connected to the network device via an operating second VPN connection. In response to determining that the second instance is connected to the network device via an operating second VPN connection, the gateway coordinator of the first instance can allow the first instance to go down.

On the other hand, in response to determining that the second instance is not connected to the network device via an operating second VPN connection, the gateway coordinator of the first instance can migrate the first VPN connection from the first instance to the second instance. For example, the first instance can transmit several parameters of the first VPN connection to the second instance. Example parameters can include a tunnel ID, a connection status, a time of last state change, etc. of the first VPN connection. In response, the second instance of the VPN gateway can take over operations related to the first VPN connection by, for example, dialing a terminal at the network device using the received tunnel ID, starting to respond to health probes to the first public IP address from a load balancer, and/or perform other suitable operations.

As such, when the first instance of the VPN gateway is down, the first VPN connection or VPN tunnel can be migrated from the first instance to the second instance. Thus, the second instance can continue to facilitate VPN operations directed to the first public IP address via the first VPN connection. As such, even when the second VPN connection is improperly configured, the network device at the on-premise private network can still send network traffic to the virtual network via the first VPN connection now hosted by the second instance. Subsequently, once the first instance becomes available again, for instance, after rebooting the server hosting the first instance, the gateway coordinator at the second instance can release the first public IP address back to the first instance by, for instance, stopping to respond to health probes from the load balancer.

In a second example scenario, the first instance and/or the server hosting the first instance can fail unexpectedly, for example, due to hardware/software failure of the server. Several embodiments of the disclosed technology can address this example scenario by configuring the gateway coordinator to continuously or periodically check with a gateway monitor whether a particular instance of the VPN gateway still "owns" or is associated with a public IP address of the VPN gateway.

In one implementation, the gateway monitor can be implemented as another virtual machine or other suitable types of software component in the cloud computing system to perform logic lock renewal with instances of the VPN gateway. For example, the first instance can initially own the first public IP address. To maintain the ownership, the first instance can periodically renewal a lock with the gateway monitor, e.g., by transmitting a renewal request and receiving a renewal response to/from the gateway monitor. While the lock is maintained, the gateway monitor can respond to status queries from the gateway coordinator of the second instance that the first public IP address is still owned by the first instance.

Upon an unexpected failure of the first instance, the lock between the first instance and the gateway monitor is lost. Upon a loss of the lock, the gateway monitor can respond to a status query from the second instance that the first public IP address is now available to be claimed. In response to receiving an indication that the first public IP address is available, the second instance can establish and maintain a lock with the gateway monitor for claiming ownership of the first public IP address. The second instance can then take over operations of the first VPN connection by, for example, starting to respond to health probes to the first public IP address from a load balancer or other suitable operations, as described above. As such, the unexpected failure of the first instance can only cause a short down time, i.e., a time between the unexpected failure of the first instance and the second instance taking over of the first public IP address from the first instance. The short down time can be about half to one minute, which is significantly shorter than the thirty minute down time suffered from the active-active VPN gateway implementation discussed above.

Several embodiments of the disclosed technology can thus provide high availability and low down time for VPN gateways. Unlike an active-active VPN gateway implementation, embodiments of the disclosed technology are directed to a hybrid implementation for multiple instances of a VPN gateway. Under normal operation, each instance of a VPN gateway can operate in an active-active mode to individually facilitate network traffic via corresponding VPN connections. When one instance fails, another instance, via implementation of the gateway coordinator, can take over a VPN connection previously associated with the failed instance and thus act as a backup for the failed instance in an active-passive mode. As such, even when one of the instances fails, another instance can maintain one or more of the VPN connections to provide highly available VPN operations.

DETAILED DESCRIPTION

Figure 1:
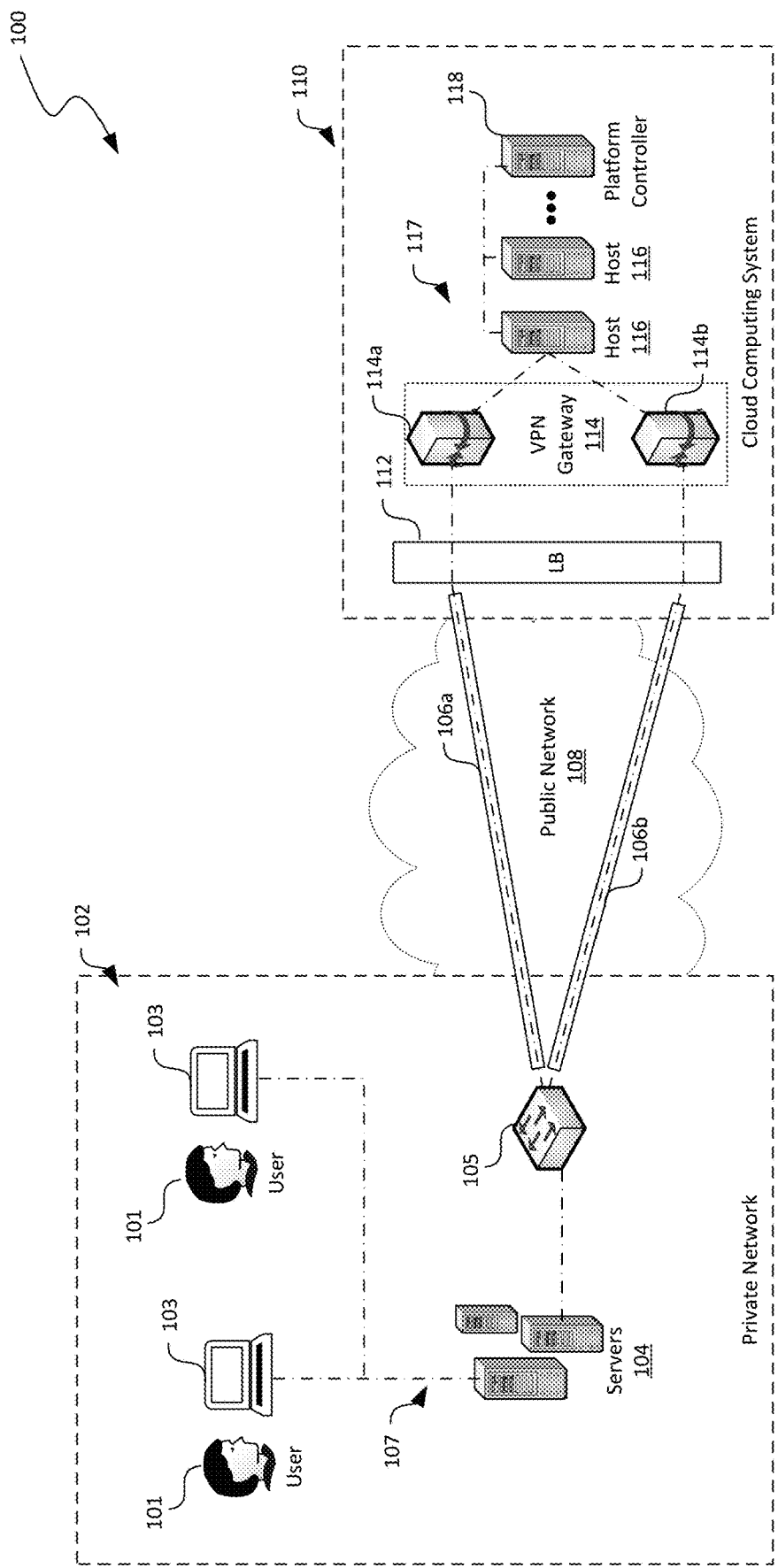
FIG. 1 is a schematic diagram illustrating a computing framework having a cloud computing system implementing VPN gateway management in accordance with embodiments of the disclosed technology.

Certain embodiments of systems, devices, components, modules, routines, data structures, and processes for VPN gateway management are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-7.

As used herein, a "cloud computing system" or a "cloud" generally refers to an interconnected computer network having a plurality of network devices that interconnect a plurality of servers or hosts to one another or to external networks (e.g., the Internet). At least some of the servers or hosts can be located in, for example, different datacenters at diverse geographical locations. A cloud can be public when accessible to the general public, or can be private when only accessible to members of an organization.

The term "network device" generally refers to a physical network device, examples of which include routers, switches, hubs, bridges, load balancers, security gateways, or firewalls. A "host" generally refers to a computing device configured to implement, for instance, one or more virtual machines or other suitable virtualized components. For example, a host can include a server having a hypervisor configured to support one or more virtual machines or other suitable types of virtual components. The one or more virtual machines can be used to execute suitable applications or computer programs to provide corresponding cloud services.

Also used herein, the term "cloud service" or "cloud computing service" generally refers to computing resources provided over a computer network such as the Internet. Common examples of cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

A virtual private network (VPN) generally refers to a computer network established via secure connections over a public or shared network, such as the Internet or a computer network in a multi-tenant cloud computing system. VPNs can be accessed via "VPN gateways" configured to implement various communications and/or security protocols used for securing and encrypting transmitted data. Example protocols include IP security (IPsec), Secure Sockets Layer (SSL) and Transport Layer Security (TLS), Point-To-Point Tunneling Protocol (PPTP), Layer 2 Tunneling Protocol (L2TP), and OpenVPN. A VPN gateway can be configured to authenticate a VPN client (e.g., a remote user) or another VPN gateway using passwords, tokens, or other suitable credentials. Once authenticated, a VPN gateway can establish a "VPN connection" or "VPN tunnel" with a VPN client or another VPN gateway. A VPN tunnel generally refers to a secure network link between a VPN gateway and a VPN client or another VPN gateway.

VPNs are a low cost technique for allowing remote users or branch offices to be securely connected via a public network, such as the Internet. In one implementation, an organization can have (i) an on-premise private network, for example, a local area network (LAN) deployed in an office and (ii) a virtual network (VNET) hosted on a cloud computing system. To secure communications between the LAN and the VNET, the virtual network of the organization can deploy a VPN gateway to interface with, for example, a network router in the private network configured to implement IPsec or other suitable secure communications protocols. In operation, the network router and the VPN gateway can send/receive encrypted network traffic across the public network as if the virtual network is directly connected to the on-premise private network.

The virtual network can typically deploy multiple instances of the same VPN gateway each with a corresponding public IP address for load balancing, service availability, or other reasons. As such, the network device at the on-premise private network can create multiple VPN connections to the multiple instances of the VPN gateway. However, such deployment of the VPN gateway may cause unacceptable VPN down time when one of the two VPN connections is not properly configured. For example, a first VPN connection can be properly configured while a second VPN connection can be improperly configured or even not configured at all. Thus, during operation, network traffic can flow between the on-premise private network and the virtual network via the first VPN connection directed until the first VPN connection fails due to, for example, maintenance or hardware/software failure of a server hosting the first instance.

Several embodiments of the disclosed technology can address certain aspects of the foregoing difficulties by implementing a gateway coordinator at each instance of a VPN gateway to provide mutual backup between the instances of the VPN gateway. In certain embodiments, a first instance of a VPN gateway can receive a notification from, for example, a platform controller of the cloud computing system. The notification indicates to the first instance that a server hosting the first instance is about to go down or otherwise become unavailable. In response to receiving the notification, the gateway coordinator of the first instance can contact a counterpart at a second instance of the VPN gateway regarding the upcoming down time of the first instance and determine whether the second instance is connected to the network device via an operating second VPN connection.

In response to determining that the second instance is not connected to the network device via an operating or functioning second VPN connection, the gateway coordinator of the first instance can migrate the first VPN connection from the first instance to the second instance. Once migrated, the second instance of the VPN gateway can take over operations related to the first VPN connection by, for example, dialing a terminal at the network device using the received tunnel ID, starting to respond to health probes to the first public IP address from a load balancer, and/or perform other suitable operations. As such, when the first instance of the VPN gateway is down, the second instance can continue to facilitate VPN operations directed to both the first public IP address via the first VPN connection even when the second VPN connection is improperly configured, as described in more detail below with reference to FIGS. 1-7.

FIG. 1 is a schematic diagram illustrating a computing framework 100 having a cloud computing system 110 implementing VPN gateway management in accordance with embodiments of the disclosed technology. As shown in FIG. 1, the computing framework 100 can include a private network 102 interconnected to a cloud computing system 110 via a public network 108. The public network 108 can include the Internet or other suitable types of a shared or public computer network. Even though only one private network 102 is shown in FIG. 1, in other embodiments, multiple private networks 102 (shown in FIGS. 5A and 5B) can be interconnected to the same cloud computing system 110.

As shown in FIG. 1, the private network 102 can be an on-premise computer network that includes a local area network 107 interconnecting one or more servers 104 and client devices 103. The servers 104 can be individually configured to execute suitable instructions to provide functionality for the client devices 103. For example, the servers 104 can be configured to provide a file management system, an electronic mail exchange, or other suitable computing services. The local area network 107 can include multiple routers, switches, firewalls, or other suitable network devices (not shown) interconnecting the servers 104 and the client device 103 via wired or wireless communications media.

The client devices 103 can each include a computing device that facilitates corresponding users 101 to access the servers 104 and various cloud services provided by the cloud computing system 110. In the illustrated embodiment, the client devices 103 individually include a desktop computer. In other embodiments, the client devices 103 can also include laptop computers, tablet computers, smartphones, or other suitable computing devices. Even though two users 101 are shown in FIG. 1 for illustration purposes, in other embodiments, the cloud computing system 110 can facilitate any suitable number of users 101.

As shown in FIG. 1, the private network 102 can also include an edge device 105 configured to interface with the cloud computing system 110 via one or more VPN connections 106. In certain embodiments, the edge device 105 can be configured to implement a secure communications protocol. In one example, the edge device 105 can include a router configured to implement IPsec protocol to provide data confidentiality, data integrity, and data authentication between the edge device 105 and one or more instances 114a and 114b of a VPN gateway 114 via VPN connections 106a and 106b, as described in more detail below. In other examples, the edge device 105 can also include a switch, a server, or other suitable components configured to implement additional and/or different secure communications protocols.

Also shown in FIG. 1, the cloud computing system 110 can include one or more hosts 116, a platform controller 118, first and second instances 114a and 114b of a VPN gateway 114, and a load balancer 112 operatively coupled by a cloud network 117. In certain embodiments, the hosts 106 can individually include a physical server or a computing blade having several physical servers individually having one or more non-volatile data storage device, computer memories, network interface cards, and/or other suitable computing components. In other embodiments, the hosts 106 can also include one or more physical servers with multiple processor cores, or other suitable types of computing devices. Though not shown in FIG. 1, the hosts 106 can be organized into racks, availability zones, groups, sets, computing clusters, or other suitable divisions. Even though two hosts 116 are shown in FIG. 1 for illustration purposes, in other embodiments, the cloud computing system 119 can include any suitable numbers of hosts 106 and/or other suitable types of components. The hosts 106 can be individually configured to host one or more virtual machines 144 (shown in FIG. 2) or other suitable software components, as described in more detail with reference to FIG. 2.

The platform controller 118 can include a fabric controller, a datacenter controller, application delivery controller, or other suitable types of controller configured to monitor status and manage operations of the hosts 106 in the cloud computing system 110. For example, the platform controller 118 can monitor whether a host 106 or components thereof has failed. In response to detecting a failure of the host 106 or components thereof, the platform controller 118 can attempt to remedy the detected failure by, for instance, migrating virtual machines hosted on the failed host 106 to other hosts 106, restarting the failed host 106, replacing hardware components of the failed host 106, and/or perform other suitable operations. Though the platform controller 118 are shown as separate physical servers in FIG. 1, in other embodiments, the platform controller 118 can also include computing services provided by one or more of the hosts 106 in the cloud computing system 110.

The load balancer 112 can be configured to distribute computer network or application traffic across the multiple instances 114a and 114b of the VPN gateway 114. In certain embodiments, the load balancer 112 can include a stand-alone hardware load balancer. In other embodiments, the load balancer 112 can include a software load balancer hosted on, for instance, one of the hosts 116. The load balancer 112 can be configured to continuously or periodically probe a health status of the instances 114a and 114b by, for example, transmitting health probe messages and monitoring responses from the transmitted health probe messages. Upon determining that one or more of the instances 114a and 114b are healthy, the load balancer 112 can forward received network traffic from the edge device 105 to the first and second instances 114a or 114b.

The VPN gateway 114 can be configured to interface with the edge device 105 via first and second VPN connections 106a and 106b via the public network 108. The VPN gateway 114 can implement various communications/security protocols used for securing and encrypting transmitted data between the edge device 105 at the private network 102 and a virtual network 146 (shown in FIG. 2) at the cloud computing system 110. As shown in FIG. 1, the VPN gateway 114 include first and second instances 114a and 114b each having a corresponding network address (e.g., an IP address) suitable for routing network traffic from the edge device 105 to the first or second instance 114a or 114b via the public network 108. In other embodiments, the VPN gateway 114 can include three, four, or any suitable number of instances (not shown).

As shown in FIG. 1, the edge device 105 is connected to the first instance 114a via the first VPN connection 116a and to the second instance 114b via the second VPN connection 116b. In operation, the edge device 105 can utilize both the first and second VPN connections 116a and 116b to transmit/receive network traffic from the virtual network 146 at the cloud computing system 110 in an active-active mode. However, one of the VPN connections 106a or 106b may not be configured properly or not even configured at all. Thus, upon a failure of a properly configured VPN connection 106, the users 101 at the private network 102 may experience a rather long down time for accessing cloud services provided by the virtual network 146 at the cloud computing system 110. Several embodiments of the disclosed technology can reduce or eliminate such down time by implementing gateway coordinators 122 (shown in FIG. 3A) at each of the first and second instances 114a and 114b, as described in more detail below with reference to FIGS. 3A-5B.

Figure 2:
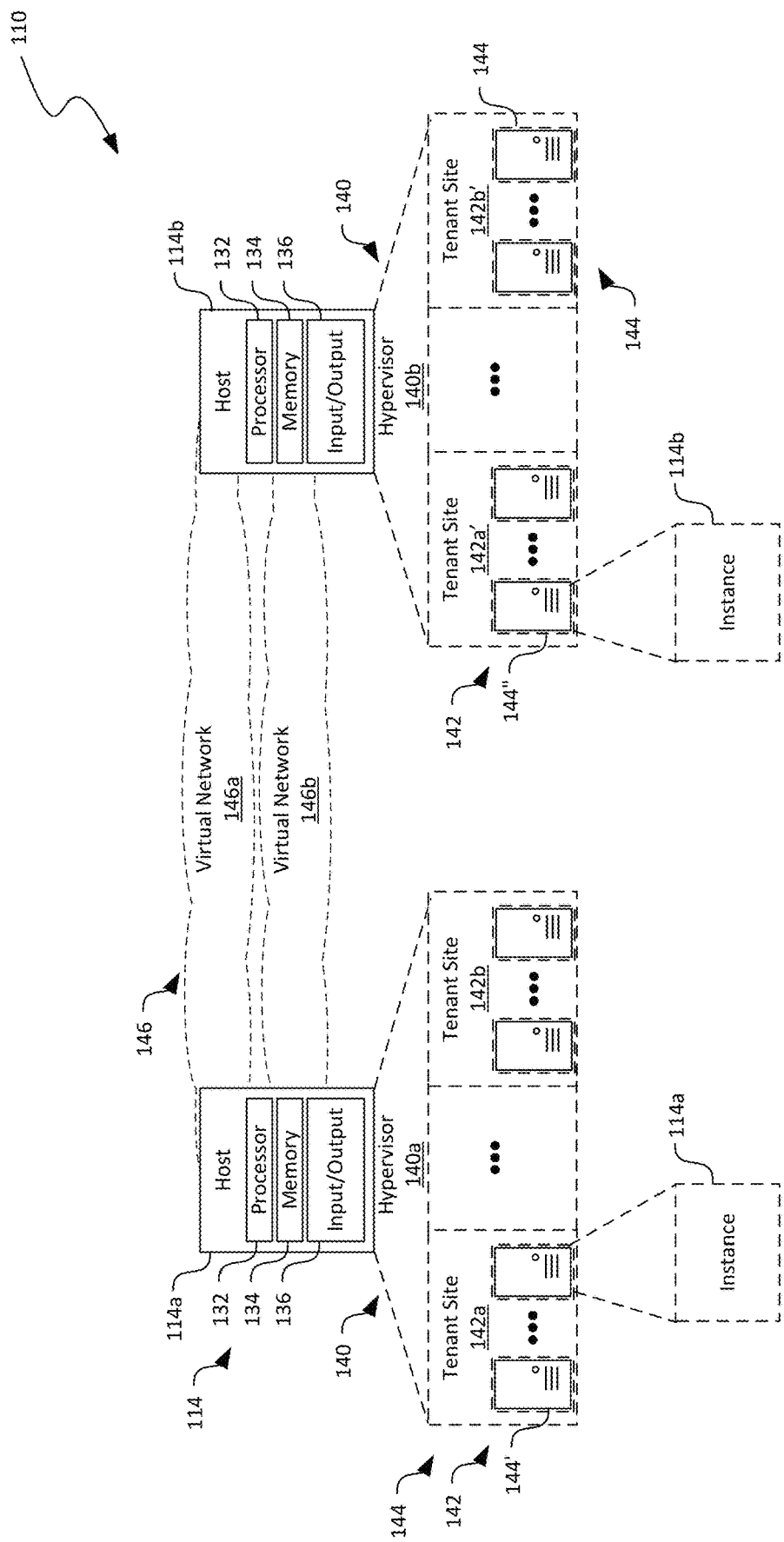
FIG. 2 is a schematic diagram illustrating certain hardware/software components of the cloud computing system of FIG. 1 in accordance with embodiments of the disclosed technology.

FIG. 2 is a schematic diagram illustrating certain hardware/software components of the cloud computing system 110 of FIG. 1 in accordance with embodiments of the disclosed technology. In FIG. 2, only certain components of the cloud computing system 110 of FIG. 1 are shown for clarity.

As shown in FIG. 2, the first host 106a and the second host 106b can each include a processor 132, a memory 134, and an input/output component 136 operatively coupled to one another. The processor 132 can include a microprocessor, a field-programmable gate array, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed herein). The input/output component 136 can include a network interface card or other suitable types of input/output devices configured to accept input from and provide output to an operator and/or an automated software controller (not shown).

The memory 134 of the first and second hosts 106a and 106b can include instructions executable by the corresponding processors 132 to cause the individual hosts 106 to provide a hypervisor 140 (identified individually as first and second hypervisors 140a and 140b) and other suitable virtual components such as virtual network interface card, virtual switches, etc. (not shown). The hypervisors 140 can individually be configured to initiate, monitor, terminate, and/or otherwise locally manage one or more virtual machines 144 organized into tenant sites 142. For example, as shown in FIG. 2, the first host 106a can provide a first hypervisor 140a that manages first and second tenant sites 142a and 142b, respectively, for the same or different tenants or users 101 (FIG. 1). The second host 106b can provide a second hypervisor 140b that manages first and second tenant sites 142a' and 142b', respectively.

The hypervisors 140 can be software, firmware, or hardware components. The tenant sites 142 can each include multiple virtual machines 144 or other suitable tenant instances for a tenant. For example, the first host 106a and the second host 106b can both host the tenant site 142a and 142a' for a first user 101a. The first host 106a and the second host 106b can both host the tenant site 142b and 142b' for a second user 101b (FIG. 1). Each virtual machine 144 can be executing a corresponding operating system, middleware, and/or applications. For example, as shown in FIG. 2, the virtual machine 144 of the first host 106a can be configured to execute suitable instructions to provide the first instance 114a while the virtual machine 144 of the second host 106b can be configured to execute suitable instructions to provide the second instance 114b. In other examples, a container (e.g., a Docker) hosted on the individual hosts 106 can also be configured to provide the first and/or second instances 114a and 114b.

Also shown in FIG. 2, the cloud computing system 110 can include one or more virtual networks 146 that interconnect the tenant sites 142a and 142b across multiple hosts 106. For example, a first virtual network 146a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks 146 (not shown) may be configured to correspond to a single tenant site 146.

The virtual machines 144 on the virtual networks 146 can communicate with one another even though the virtual machines 144 are located on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a virtual network 146. Thus, different virtual networks 146 can use one or more virtual network addresses that are the same. Example virtual network addresses can include IP addresses, MAC addresses, and/or other suitable addresses.

Figure 3A:
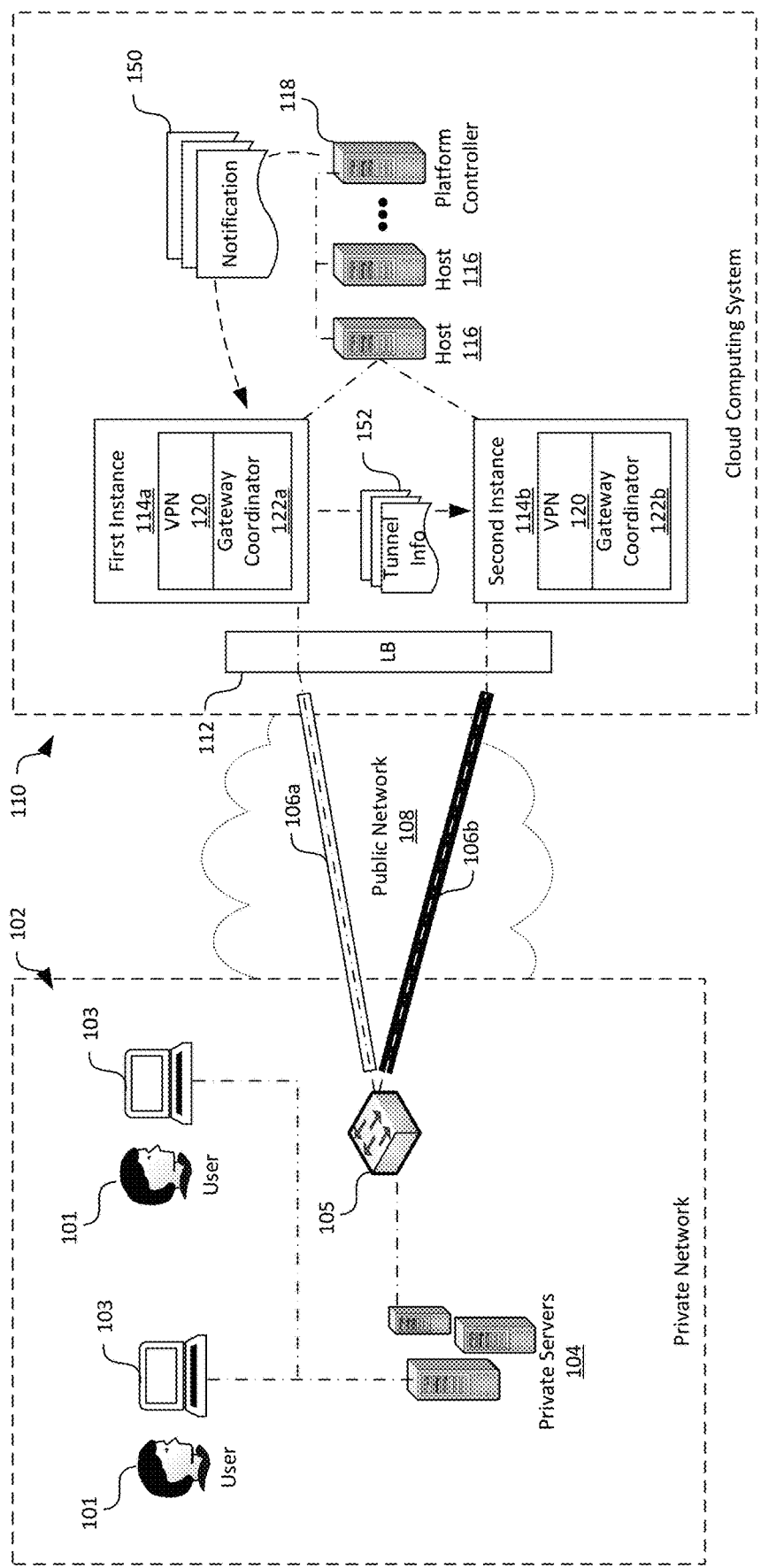
FIGS. 3A-3C are schematic diagrams illustrating certain components of the computing framework in FIG. 1 during certain stages of operation in accordance with embodiments of the disclosed technology.
Figure 3B:
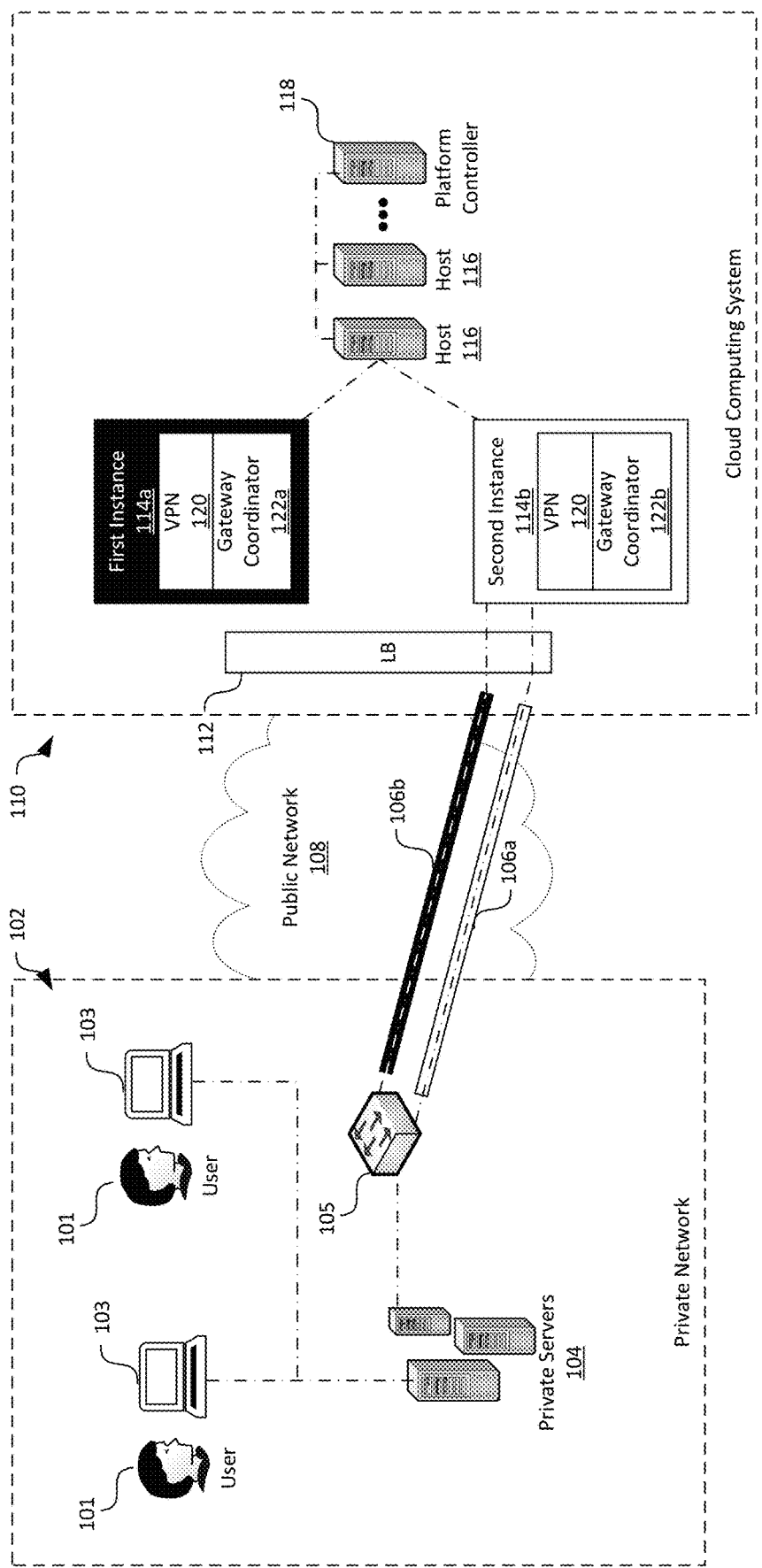
Figure 3C:
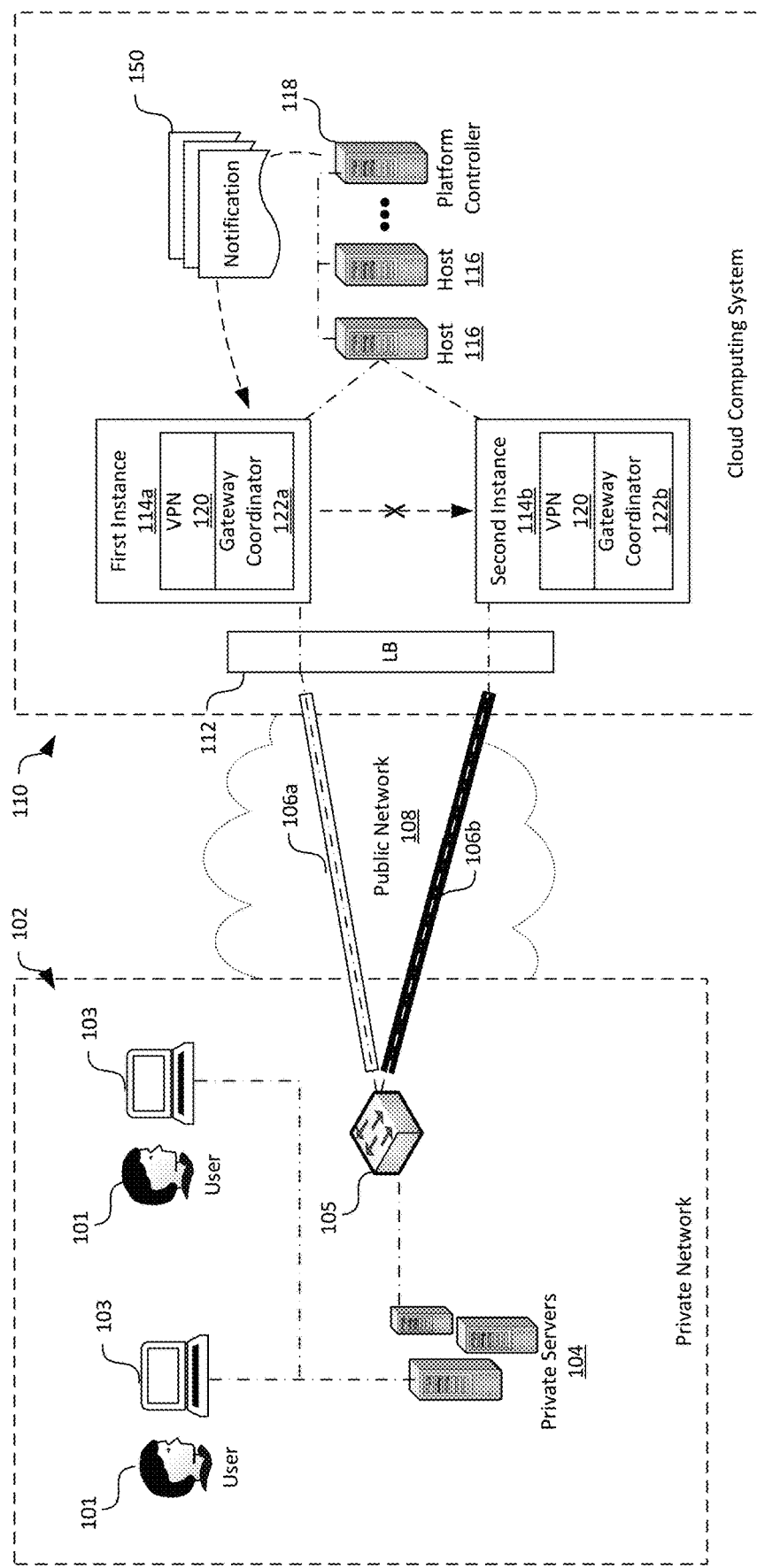

FIGS. 3A-3C are schematic diagrams illustrating certain components of the computing framework 100 in FIG. 1 during certain stages of operation in accordance with embodiments of the disclosed technology. As shown in FIG. 3A, each of the first and second instances 114a and 114b can include a VPN component 120 and a gateway coordinator 122 (shown as first and second gateway coordinators 122a and 122b) operatively coupled to one another. The VPN component 120 can be configured to implement various secure communications protocols such as IPsec and facilitate establishing, maintaining, as well as facilitating data transfer to/from the edge device 105 via the VPN connections 106a and 106b. For example, the VPN component 120 can include an authentication routine for authenticating connection requests, encapsulation/decapsulation routine for manipulating packets transmitted via the VPN connections 106a and 106b, and encryption/decryption routines for encrypting/decrypting content of the received/transmitted packets.

The gateway coordinator 122 can be configured to manage ownership of first and second network addresses associated with first and second instance 114a and 114b of the VPN gateway 114 (FIG. 1), respectively By managing the first and second network addresses, one or more of the first and second VPN connections 106a and 106b to the edge device 105 can be maintained under several example scenarios described below to reduce or eliminate down time when one of the first or second VPN connection 106a and 106b is improperly configured or not even configured at all.

In a first example scenario shown in FIG. 3A, the first VPN connection 106a is properly configured to carry network traffic between the edge device 105 and the cloud computing system 110. However, the second VPN connection 106b may be improperly configured or not even configured at all, as shown in reverse contrast in FIG. 3A. As such, the edge device 105 cannot transmit/receive any network traffic to/from the cloud computing system 110 via the second VPN connection 106b.

The non-functioning second VPN connection 106b may cause long down times when the first instance 114a is terminated due to, for instance, scheduled system maintenance, hardware/software failures, or other reasons. For example, as shown in FIG. 3A, the platform controller 118 can transmit a notification 150 to the first instance 114a or a host 106 (shown in FIG. 1) hosting the first instance 114a. The notification 150 indicates to the first instance 114a that host 106 hosting the first instance 114a is about to be shut down or otherwise become unavailable. In certain implementations, once the first instance 114a is terminated, the edge device 105 would be unable to transmit/receive any network traffic to/from the cloud computing system 100 because the second VPN connection 106b is not functioning.

Several embodiments of the disclosed technology can address at least certain aspects of the foregoing difficulty by implementing the gateway coordinators 122. For example, as shown in FIG. 3A, in response to receiving the notification 150, the first gateway coordinator 122a of the first instance 114a can contact the second gateway coordinator 122b at the second instance 114b of the VPN gateway 114 regarding the upcoming down time of the first instance 114a and determine whether the second instance 114b is connected to the edge device 105 via a functioning second VPN connection 106b. For example, the first gateway coordinator 122a can request the second gateway coordinator 122b to dial the edge device 105 via the second VPN connection 106b and report results. In response to determining that the second instance 114b is connected to the edge device 105 via a functioning second VPN connection 106b, the first gateway coordinator 122a of the first instance 114a can allow the first instance 114a to go down.

On the other hand, as shown in FIG. 3A, in response to determining that the second instance 114b is not connected to the edge device 105 via a functioning second VPN connection 106b, the first gateway coordinator 122a of the first instance 114a can migrate the first VPN connection 106b from the first instance 114a to the second instance 114b. For example, the first instance 114a can transmit several parameters of the first VPN connection 106a (shown in FIG. 3A as "tunnel info 152") to the second instance 114b. Example parameters can include a tunnel ID, a connection status, a time of last state change, etc. of the first VPN connection 106a. In response, the second instance 114b of the VPN gateway 114 can take over operations related to the first VPN connection 106a by, for example, dialing a terminal at the edge device 105 using the received tunnel ID, starting to respond to health probes to the first network address from the load balancer 112, and/or perform other suitable operations.

As such, as shown in FIG. 3B, when the first instance 114a of the VPN gateway 114 is down (shown in reverse contrast), the first VPN connection 106a can be migrated from the first instance 114a to the second instance 114b. Thus, the second instance 114b can continue to facilitate VPN operations directed to the first network address via the first VPN connection 106a. As such, even when the second VPN connection 106b is improperly configured, the edge device 105 at the private network 102 can still send network traffic to the virtual network 146 (FIG. 2) via the first VPN connection 106a now hosted by the second instance 114b.

Subsequently, once the first instance 114a becomes available again, for instance, after rebooting the host 106 hosting the first instance 114a, the second gateway coordinator 122b at the second instance 114b can release the first network address back to the first instance 114a by, for instance, stopping to respond to health probes from the load balancer 112, as shown in FIG. 3A. In certain implementations, the first and second gateway coordinators 122a and 122b can track a corresponding primary network address for each of the first and second instances 114a and 114b. For instance, a primary network address of the first instance 114a can be the first network address while that of the second instance 114b is the second network address. Thus, once the first instance 114a becomes available again, the first gateway coordinator 122a can inform the second gateway coordinator 122b that the first instance 114a is now available again. In response, the second gateway coordinator 122b can determine that the first network address is not a primary network address of the second instance 114b, and thus release the first network address back to the first instance 114a.

In other implementations, the first and second gateway coordinators 122a and 122b may implement a leader election heuristics to assign a network address for each of the first and second instances 114a and 114b. Thus, in response to receiving a notification that the first instance 114a is now available, the second gateway coordinator 122b can release to the first instance, one of the first or second network address randomly, or one of the first or second network address that is not connected to the edge device 105 via a functioning VPN connection 106. In further implementations, the second gateway coordinator 122b may release all of the first and second public addresses to the first instance 122a, for example, when the second instance 114b is preparing to be terminated.

The operations described above with reference to FIGS. 3A and 3B involve the first instance 114a receiving the notification 150 indicating an upcoming termination of the first instance 114a and coordination between the first and second instances 114a and 114b before the first instance 114a is terminated. In certain situations, however, such a notification 150 may not be available and/or the first and second gateway coordinators 122a and 122b may not be allowed to coordinate the migration of the first VPN connection 106a. For example, the host 106 hosting the first instance 114a may experience a hardware/software failure and shuts down, resulting in sudden termination of the first instance 114a. In another example, the first instance 114 itself may experience an execution failure such as a memory fault and cease to function. In a further example, network communications between the first instance 114a and the second instance 114b may be lost, as shown in FIG. 3C. Under any of the foregoing scenarios, several embodiments of the disclosed technology can reduce a down time experienced by the users 101 by implementing a gateway monitor 124 (shown in FIG. 4A), as described in more detail below with reference to FIGS. 4A-4C.

Figure 4A:
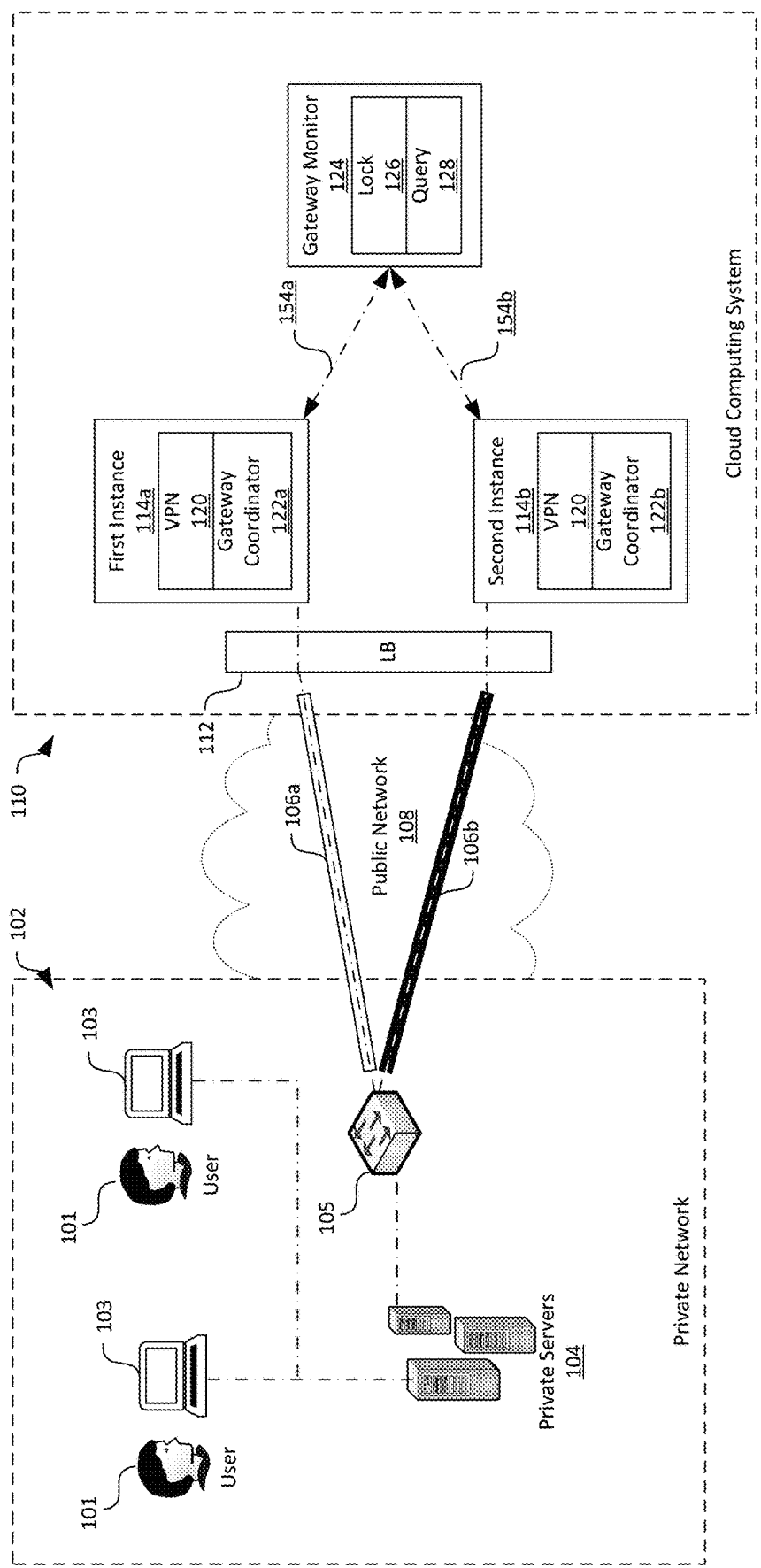
FIGS. 4A-4C are schematic diagrams illustrating certain components of the computing framework in FIG. 1 during other stages of operation in accordance with embodiments of the disclosed technology.
Figure 4B:
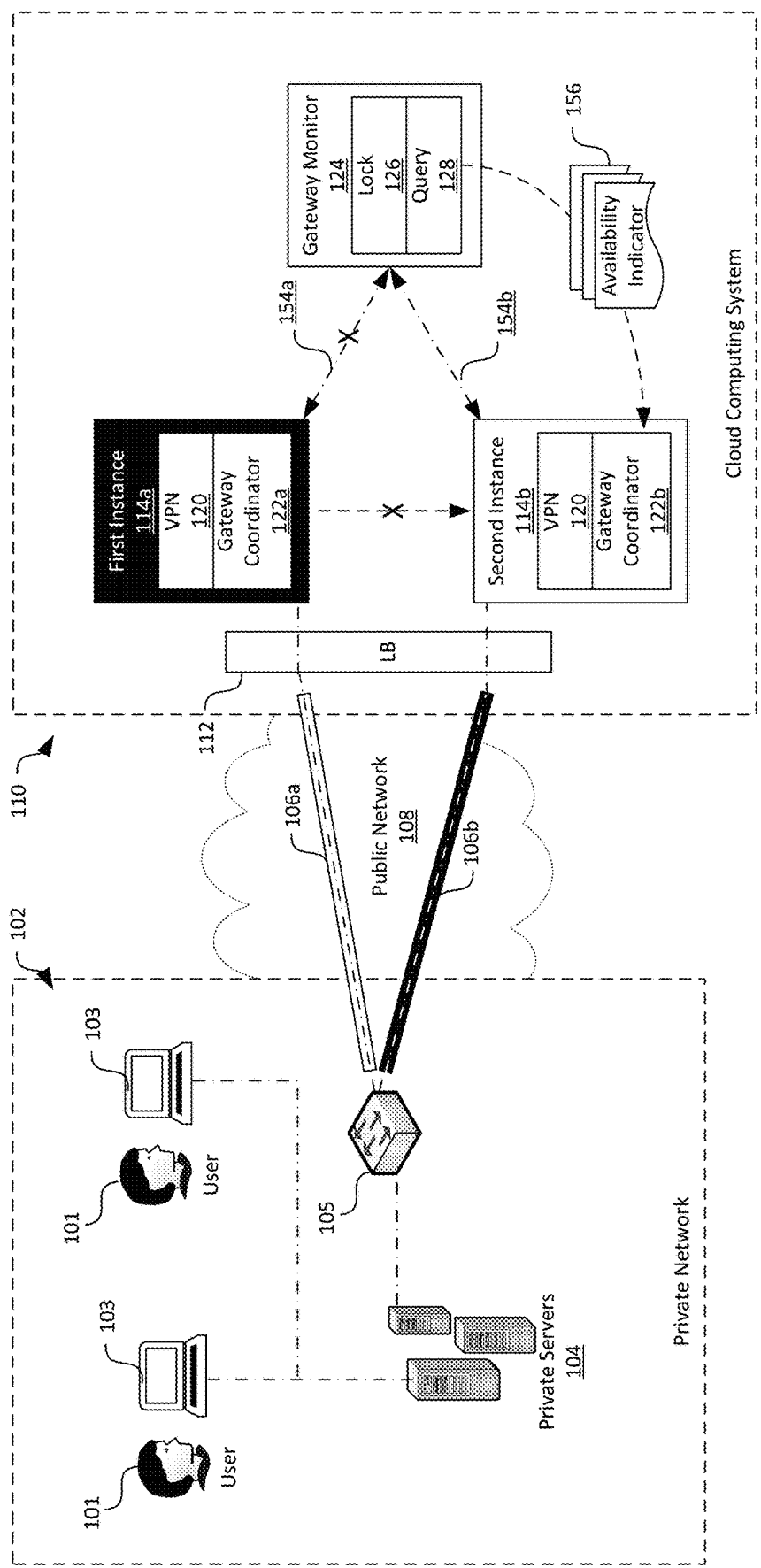
Figure 4C:
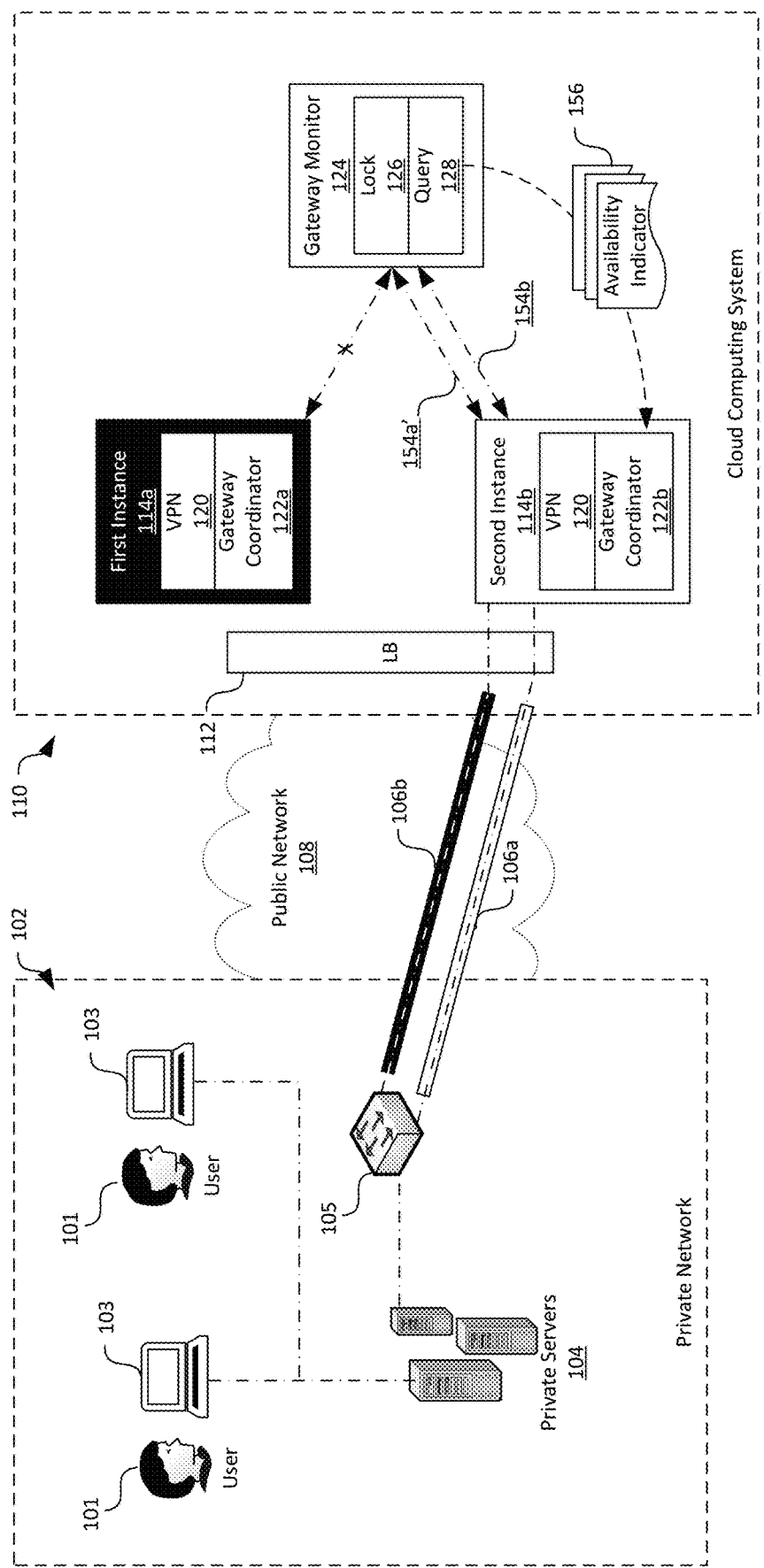

FIGS. 4A-4C are schematic diagrams illustrating certain components of the computing framework 100 in FIG. 1 during stages of operation facilitated by a gateway monitor 124 in accordance with embodiments of the disclosed technology. As shown in FIG. 4A, the gateway monitor 124 can be communicatively coupled to the first and second instances 122a and 122b via, for instance, a virtual network 146 (FIG. 2). The gateway monitor 124 can be an application executed on a host 106 (FIG. 1) or a virtual machine 144 (FIG. 2) to provide a lock module 126 and a query module 128 operatively coupled to one another.

The lock module 126 can be configured to allow the first and second gateway coordinators 122a and 122b to "lock" one of the first or second network addresses via, for instance, renewal of first and second locks 154a and 154b, respectively. As used herein, the term "lock" or "logic lock" generally refers to a subject-monitor relationship between a pair of end points such as the first and second instances 114a and 114b and the gateway monitor 124 regarding a network address. In certain embodiments, the subject-monitor relationship can be established and/or renewed via exchange of periodic renewal requests and renewal responses between a pair of end points. In one example, a first end point (e.g., the first gateway coordinator 122a), acting as a subject can send periodic renewal requests to a second end point (e.g., the gateway monitor 124) acting as a monitor. If the second end point determines that the received renewal request is proper, the second end point can establish or renew a lock with the first end point regarding a network address (e.g., the first network address) by transmitting a renewal response to the first end point. In other embodiments, the subject-monitor relationship can be established and/or renewed via query-response, event monitoring, or other suitable techniques. A lock can be lost or failed when, for example, an appropriate renewal request (e.g., in an appropriate format) from the first gateway coordinator 122a is not received at the gateway monitor 124 within a set period of time, for example, thirty seconds, sixty second, etc.

In the illustrated example, the first gateway coordinator 122a can lock the first network address while the second gateway coordinator 122b can lock the second network address via the first and second locks 154a and 154b, respectively. While the first and second network addresses are locked, the query module 128 can respond to queries (not shown) from the first and second gateway coordinators 122a and 122b indicating that the first and second addresses are locked and thus unavailable to be claimed.

As shown in FIG. 4B, when the first instance 114a unexpectedly fails or communications between the first and second gateway coordinators 122a and 122b are lost, the first lock 154a can be released due to a lack of renewal request from the first gateway coordinator 122a. In response, the query module 128 can be configured to provide an availability indicator 156 in response to a query from the second gateway coordinator 122b or upon detecting the release of the first lock 154a. The availability indicator 156 indicates to the second gateway coordinator 122b that the first network address is now available to be claimed. In response, as shown in FIG. 4C, the second gateway coordinator 122b can establish and maintain another first lock 154a' with the gateway monitor 124 for locking the first network address. Upon locking the first network address, the second gateway coordinator 122b can cause the second instance 114b to take over VPN operations of the first VPN connection 106a, as described above with reference to FIG. 3B. As such, even if first instance 114a fails unexpectedly or communications between the first and second gateway coordinators 122a and 122b are lost, the second instance 114b can still maintain the first VPN connection 106a to the edge device 105.

Figure 5A:
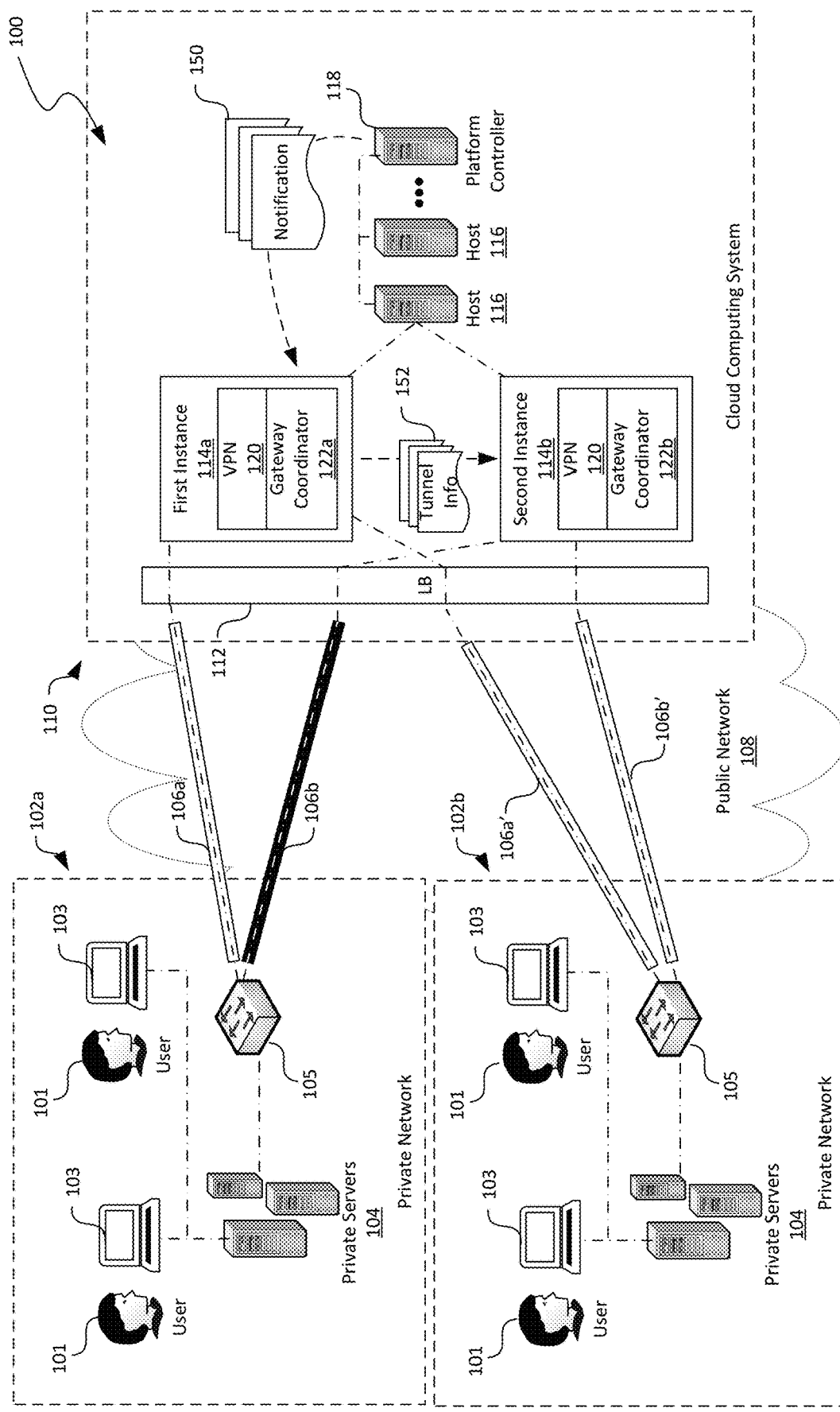
FIGS. 5A and 5B are schematic diagrams illustrating certain components of computing framework in FIG. 1 during additional stages of operation in accordance with embodiments of the disclosed technology.
Figure 5B:
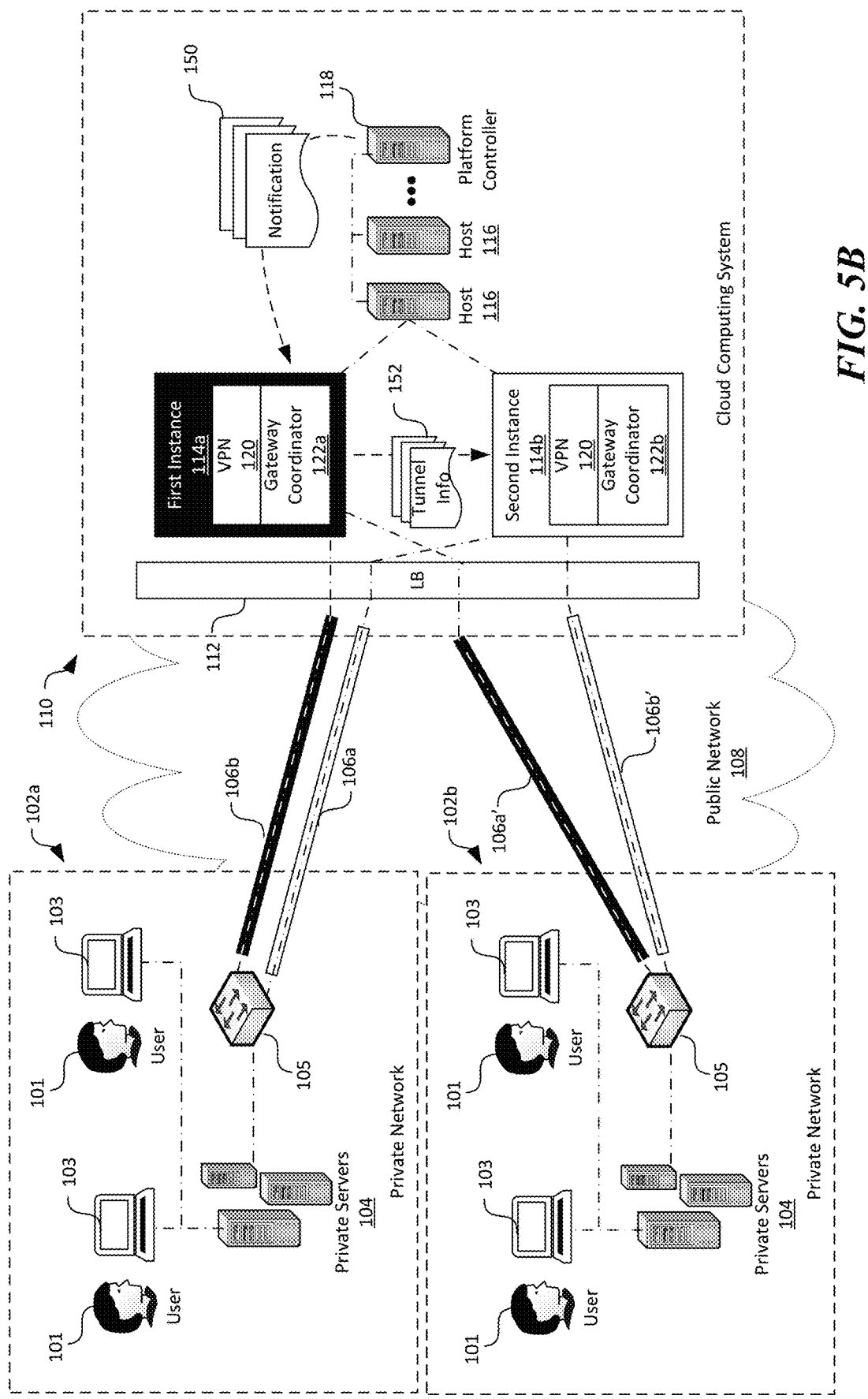

FIGS. 5A and 5B are schematic diagrams illustrating certain components of computing framework in FIG. 1 during additional stages of operation involving multiple private networks 102 in accordance with embodiments of the disclosed technology. As shown in FIG. 5A, the computing framework 100 can include a first private network 102a and a second private network 102b both interconnected to the first and second instances 114a and 114b of the cloud computing system 110 via corresponding VPN connections 106. For example, the first private network 102a is connected to the first and second instances 114a and 114b of the VPN gateway 114 via the first and second VPN connections 106a and 106b. The second private network 102b is connected to the first and second instances 114a and 114b of the VPN gateway 114 via the first and second VPN connections 106a' and 106b'.

Several embodiments of the disclosed technology can also reduce a number of times the VPN connections 106 are migrated during operation. For example, as shown in FIG. 5A, the first instance 114a can receive the notification 150 from the platform controller 118 indicating that the first instance 114a is to be terminated. In response, the first gateway coordinator 122a can detect whether at least one VPN connection 106 exists between the edge devices 105 and the VPN gateway 114 when the first instance 114a is terminated. In the illustrated example, when the first instance 114a is terminated, the edge device 105 of the first private network 102a would lost all connection to the cloud computing system 110 because the second VPN connection 106b is improperly configured. On the other hand, the edge device 105 of the second private network 102b would still have a connection to the cloud computing system 110 because the second VPN connection 106b' is properly configured and functioning.

In response to the foregoing determinations, the first gateway coordinator 122a can coordinate with the second gateway coordinator 122b to migrate only the first VPN connection 106a of the first private network 102a to the second instance 114b but not the other first VPN connection 106a' of the second private network 102b, as shown in FIG. 5B. As such, connection migration in the cloud computing system 110 can be maintained at a minimum. Subsequently, once the first instance 114a becomes available again, the first VPN connection 106a can be migrated back to the first instance 114a, as described above with reference to FIG. 3B. The first VPN connection 106a' of the second private network 102b can then be re-established without connection migration.

Figure 6A:
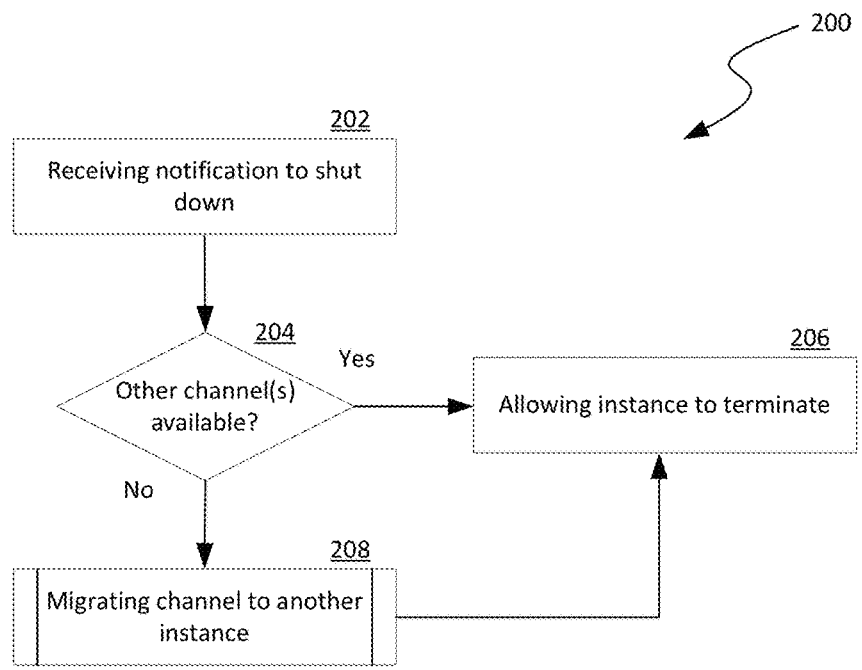
FIGS. 6A-6B are flowcharts illustrating certain processes of VPN gateway management in accordance with embodiments of the disclosed technology.
Figure 6B:
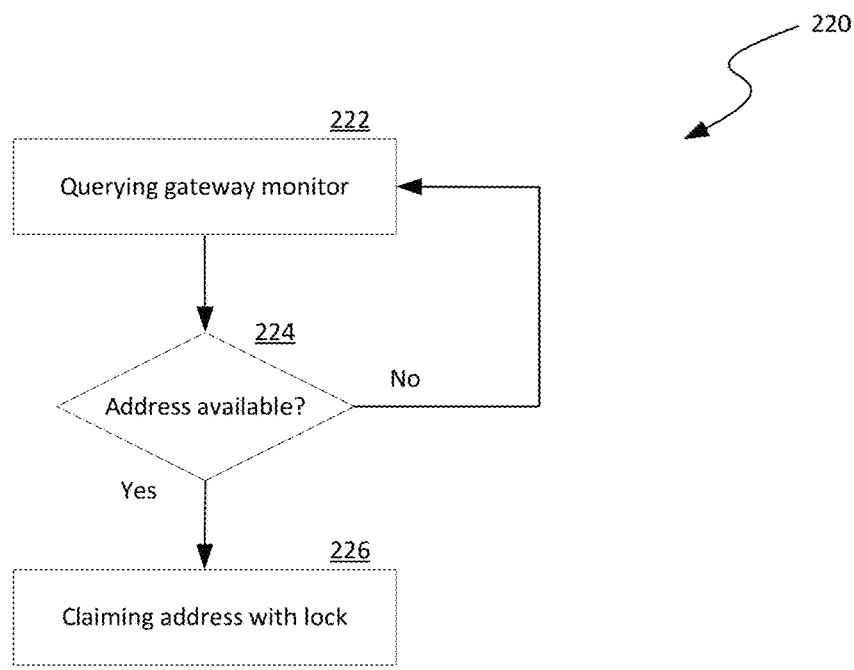

FIGS. 6A-6C are flowcharts illustrating certain processes of VPN gateway management in accordance with embodiments of the disclosed technology. Even though embodiments of the processes are described below with reference to the computing framework 100 of FIG. 1, in other embodiments, the processes can be implemented in computing frameworks with additional and/or different components.

As shown in FIG. 6A, a process 200 can include receiving a notification that an instance of a VPN gateway is about to be shut down at stage 202. In one example, the notification can be transmitted from a platform controller 118 (FIG. 1) and the shut down can be related to a scheduled maintenance of a host 106 (FIG. 1) hosting the instance or related to other suitable reasons. The process 200 can then include a decision stage 204 to determine whether other VPN connection(s) or channel(s) are still available after the instance is terminated. In one implementation, the determination can be performed via query and response between the first and second gateway coordinators 114a and 114b (FIG. 3A) of the VPN gateway. In other embodiments, the determination can be performed in other suitable manners.

In response to determining that other VPN connection(s) or channel(s) are still available after the instance is terminated, the process 200 can include allowing the instance to be terminated at stage 206. Otherwise, the process 200 can include migrating a VPN connection or channel currently connected to the instance to another instance at stage 208. In certain embodiments, migrating the VPN connection or channel can include transmitting certain parameters such as a tunnel ID, a connection status, a time of last state change, to the another instance. In other embodiments, migrating the VPN connection or channel can also include copying configuration data (e.g., authentication settings, encryption settings, etc.) from the instance to the another instance. In further embodiments, migrating the VPN connection or channel can also include claiming a network address by the another instance, as described above with reference to FIGS. 4A-4C. Example operations of claiming a network address are described in more detail below with reference to FIG. 6B.

As shown in FIG. 6B, the operations of claiming a network address can include querying a gateway monitor 124 (FIG. 4A) for availability of network addresses at stage 222. The operations can then include a decision stage 224 to determine whether a network address is available. In response to determining that a network address is available to be claimed, the operations include claiming the network address by, for instance, establishing a lock at stage 226. Otherwise, the operations include reverting to querying the gateway monitor 124 for available network addresses at stage 222 at suitable intervals.

Figure 7:
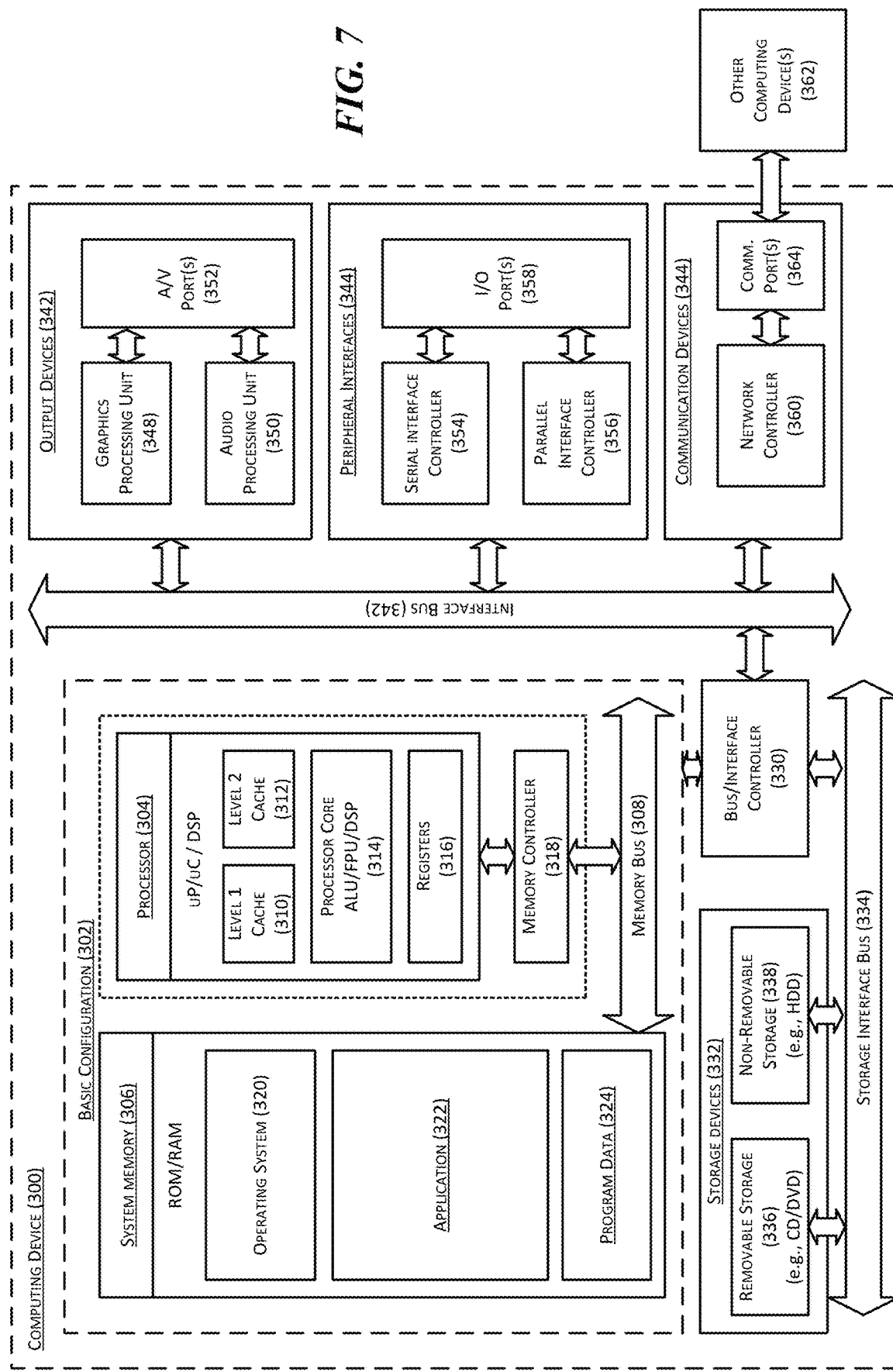
FIG. 7 is a computing device suitable for certain components of the cloud computing system in FIG. 1.

FIG. 7 is a computing device 300 suitable for certain components of the computing framework 100 in FIG. 1. For example, the computing device 300 can be suitable for the client devices 102, hosts 106, or the VPN gateway 114 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 10 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method for managing a virtual private network (VPN) gateway having first and second instances for facilitating VPN communications between a private network and a cloud computing system, the method comprising:
    receiving, at the first instance of the VPN gateway, a notification that the first instance is about to be terminated, the first instance being connected to an edge device of the private network via a first VPN connection through a public network; and
    in response to receiving the notification,
        querying the second instance of the VPN gateway, by the first instance, whether the second instance of the VPN gateway is connected to the same edge device at the private network via a functioning second VPN connection through the public network; and
        in response to determining that the second instance of the VPN gateway is not connected to the private network via a functioning second VPN connection, migrating the first VPN connection from the first instance to the second instance such that the edge device of the private network is connected to the second instance via the migrated first VPN connection, thereby allowing the private network to continue transmitting network traffic to the cloud computing system via the second instance when the first instance is terminated.

2. The method of claim 1, further comprising:
in response to determining that the second instance of the VPN gateway is connected to the private network via a functioning second VPN connection, allowing the first instance to be terminated without migrating the first VPN connection.

3. The method of claim 1 wherein migrating the first VPN connection includes:
transmitting, from the first instance to the second instance, data representing one or more of a tunnel ID, a connection status, or a time of last state change of the first VPN connection.

4. The method of claim 1 wherein migrating the first VPN connection includes:
transmitting, from the first instance to the second instance, data representing one or more of a tunnel ID, a connection status, a time of last state change of the first VPN connection; and
dialing, from the second instance, a terminal at the edge device of the private network according to the received data representing one or more of the tunnel ID, the connection status, or the time of last state change.

5. The method of claim 1 wherein:
the first instance has a network address configured to route network traffic from the edge device to the first instance via the public network; and
migrating the first VPN connection includes:
re-assigning the network address from the first instance to the second instance.

6. The method of claim 1 wherein:
the first instance has a first network address configured to route network traffic from the edge device to the first instance via the public network;
the second instance has a second network address configured to route network traffic from the edge device to the second instance via the public network; and
migrating the first VPN connection includes re-assigning the first network address from the first instance to the second instance such that the second instance is a network destination for both the first and second network addresses.

7. The method of claim 1 wherein:
the first instance has a first network address configured to route network traffic from the edge device to the first instance via the public network;
the second instance has a second network address configured to route network traffic from the edge device to the second instance via the public network; and
migrating the first VPN connection includes:
re-assigning the network address from the first instance to the second instance; and
responding, by the second instance, to health probes directed to both the first and second network addresses.

8. The method of claim 1, further comprising:
subsequent to migrating the first VPN connection from the first instance to the second instance,
transmitting, from the first instance to the second instance, a notification that the first instance has recovered; and
in response to receiving the notification, migrating the first VPN connection from the second instance back to the first instance.

9. The method of claim 1 wherein:
the first instance has a network address configured to route network traffic from the edge device to the first instance via the public network; and
the method further includes subsequent to migrating the first VPN connection from the first instance to the second instance,
transmitting, from the first instance to the second instance, a notification that the first instance has recovered; and
in response to receiving the notification, migrating the first VPN connection from the second instance back to the first instance and ceasing to respond to health probes directed to the first network address at the second instance.

10. A method for managing a virtual private network (VPN) gateway having first and second instances individually having a first network address and a second network address, respectively, for facilitating VPN communications between a private network and a cloud computing system, the method comprising:
querying, from the second instance, whether a logic lock on the first network address is maintained by the first instance via periodic renewal, the first instance being connected to an edge device of the private network via a VPN connection through a public network; and
in response to receiving a query result indicating that a logic lock on the first network address is lost by the first instance,
establishing and maintaining, by the second instance, another logic lock on the first network address via periodic renewal; and
upon successfully placing the another logic lock on the first network address by the second instance, migrating the VPN connection from the first instance to the second instance such that the edge device of the private network is connected to the second instance via the migrated VPN connection, thereby allowing the private network to continue transmitting network traffic to the cloud computing system via the second instance.

11. The method of claim 10 wherein querying whether a logic lock on the first network address is maintained by the first instance includes:
querying a gateway monitor whether the first instance has renewed the logic lock on the first network address; and
receiving the query result from the gateway monitor, the query result containing data representing whether the first instance has renewed the logic lock on the first network address.

12. The method of claim 10, further comprising:
in response to receiving a query result indicating that a logic lock on the first network address is maintained by the first instance, repeating, periodically, querying whether the logic lock on the first network address is maintained by the first instance at a later time.

13. The method of claim 10 wherein migrating the VPN connection includes:
transmitting, from the first instance to the second instance, data representing one or more of a tunnel ID, a connection status, or a time of last state change of the VPN connection.

14. The method of claim 10 wherein migrating the first VPN connection includes:
transmitting, from the first instance to the second instance, data representing one or more of a tunnel ID, a connection status, a time of last state change of the VPN connection; and dialing, from the second instance, a terminal at the edge device of the private network according to the received data representing one or more of the tunnel ID, the connection status, or the time of last state change.

15. The method of claim 10 wherein migrating the first VPN connection includes:
   transmitting, from the first instance to the second instance, data representing one or more of a tunnel ID, a connection status, a time of last state change of the VPN connection;
   dialing, from the second instance, a terminal at the edge device of the private network according to the received data representing one or more of the tunnel ID, the connection status, or the time of last state change; and
   responding, by the second instance, to health probes directed to both the first and second network addresses.

16. A computing device in a cloud computing system, the computing device comprising:
   a processor; and
   a memory containing instructions executable by the processor to cause the computing device to provide an instance of a virtual private network (VPN) gateway, the memory also containing additional instructions executable by the processor to:
      receive, at the instance of the VPN gateway, a notification that the instance is about to be terminated, the instance being connected to an edge device of a private network via a VPN connection through a public network; and
      in response to receiving the notification,
         querying, by the instance, another instance of the VPN gateway whether the another instance of the VPN gateway is connected to the edge device at the private network via another functioning VPN connection through the public network; and
         in response to determining that the another instance of the VPN gateway is not connected to the private network via a functioning VPN connection, migrating the VPN connection from the instance to the another instance such that the edge device of the private network is connected to the another instance via the migrated VPN connection, thereby allowing the private network to continue transmitting network traffic to the cloud computing system via the second instance when the first instance is terminated.

17. The computing device of claim 16 wherein the memory contains further instruction executable by the processor to cause the computing device to:
   allow the instance to be terminated without migrating the VPN connection in response to determining that the another instance of the VPN gateway is connected to the private network via another functioning VPN connection.

18. The computing device of claim 16 wherein to migrate the VPN connection includes:
   to transmit, from the instance to the another instance, data representing one or more of a tunnel ID, a connection status, or a time of last state change of the VPN connection.

19. The computing device of claim 16 wherein the instance of the VPN gateway has a network address, and wherein to migrate the VPN connection includes:
   to transmit, from the instance to the another instance, data representing one or more of a tunnel ID, a connection status, or a time of last state change of the VPN connection; and
   to cease, at the instance, responding to health probes directed to the network address.

20. The computing device of claim 16 wherein to receive the notification that the instance is about to be terminated includes:
   to receive a notification indicating at least one of:
      a virtual machine hosting the instance is about to be terminated;
      the computing device is about to shut down; or
      the instance hosted in the virtual machine is about to be shut down.

* * * * *